United States Patent
Wu (10) Patent No.: US 9,869,870 B2
(45) Date of Patent: Jan. 16, 2018

(54) 3D DISPLAY DEVICE WITH ADJUSTABLE GRATING LAYER

(71) Applicant: BOE TECHNOLOGY GROUP CO., LTD., Beijing (CN)

(72) Inventor: Naifu Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 232 days.

(21) Appl. No.: 14/370,397

(22) PCT Filed: Jun. 27, 2013

(86) PCT No.: PCT/CN2013/078214
§ 371 (c)(1),
(2) Date: Jul. 2, 2014

(87) PCT Pub. No.: WO2014/176820
PCT Pub. Date: Nov. 6, 2014

(65) Prior Publication Data
US 2016/0116752 A1    Apr. 28, 2016

(30) Foreign Application Priority Data
Apr. 28, 2013  (CN) .......................... 2013 1 0156232

(51) Int. Cl.
*G02B 27/22*  (2006.01)
*G02B 27/00*  (2006.01)

(52) U.S. Cl.
CPC ..... *G02B 27/2214* (2013.01); *G02B 27/0093* (2013.01)

(58) Field of Classification Search
CPC ............ G02B 27/2214; G02B 27/0093; H04N 13/0404; H04N 13/0497; H04N 13/0409; H04N 13/0055
(Continued)

(56) References Cited

U.S. PATENT DOCUMENTS 7,116,387 B2 * 10/2006 Tsai .................... G02F 1/13363
                                                                    348/E13.03
2004/0263670 A1 * 12/2004 Yamasaki ............. G06F 3/0412
                                                                    348/340
(Continued)

FOREIGN PATENT DOCUMENTS

CN         1506714 A      6/2004
CN         1841125 A     10/2006
(Continued)

OTHER PUBLICATIONS

PCT International Search Report and Written Opinion of the International Searching Authority (Chinese language) for PCT/CN2013/078214; 13 pages.
(Continued)

*Primary Examiner* — Bumsuk Won
*Assistant Examiner* — Henry Duong
(74) *Attorney, Agent, or Firm* — Banner & Witcoff, Ltd.

(57) ABSTRACT

A 3D display device, comprising: a display panel (01); a first grating layer (02), located at a light exiting side of the display panel (01) and comprising hole-like light-transmitting regions arranged in an array form; a second grating layer (03), located over the first grating layer (02) and comprising hole-like light-transmitting regions arranged in an array form; and an adjusting device (04), configured to adjust a relative shift between the first grating layer (02) and the second grating layer (03) so as to realize switching between a 2D display state and a 3D display state, wherein, the hole-like light-transmitting regions included in the first grating layer (02) correspond to the hole-like light-transmitting regions included in the second grating layer (03) in a one-to-one correspondence relationship, pixel units (05) arranged in an array form are provided within the display panel (01); in the 2D display state, an overlap region of projections of each pair of the hole-like light-transmitting (Continued)

regions on the display panel (01) covers a region of at least one pixel unit (05); in the 3D display state, an overlap region of projections of each pair of the hole-like light-transmitting regions on the display panel (01) is smaller than the region of one pixel unit (05).

20 Claims, 4 Drawing Sheets (58) Field of Classification Search
    USPC ......................................................... 359/462
    See application file for complete search history.

(56) References Cited

U.S. PATENT DOCUMENTS

| | | | |
|---|---|---|---|
| 2006/0114415 A1* | 6/2006 | Shestak | G02B 27/2214 353/7 |
| 2007/0008619 A1 | 1/2007 | Cha et al. | |
| 2007/0103620 A1* | 5/2007 | Leu | G02B 5/203 349/106 |
| 2012/0033297 A1* | 2/2012 | Hsiao | G02B 27/0093 359/462 |
| 2012/0162201 A1* | 6/2012 | Choi | H04N 13/0409 345/419 |
| 2013/0021561 A1* | 1/2013 | Ahn | G02F 1/133512 349/77 |
| 2014/0168744 A1* | 6/2014 | Li | G02F 1/155 359/266 |
| 2015/0009304 A1* | 1/2015 | Linge | H04N 13/0406 348/51 |

FOREIGN PATENT DOCUMENTS

| | | |
|---|---|---|
| CN | 1893674 A | 1/2007 |
| CN | 203191638 U | 9/2013 |

OTHER PUBLICATIONS

English Translation of the Abstract of CN1506714A (cited above); 1 page.
English Translation of the Abstract of CN1841125A (cited above); 1 page.
English Translation of the Abstract of CN1893674A (cited above); 1 page.
English Translation of the Abstract of CN203191638U (cited above); 1 page.
Nov. 3, 2015—International Preliminary Report on Patentability Appn PCT/CN2013/078214.

* cited by examiner

3D DISPLAY DEVICE WITH ADJUSTABLE GRATING LAYER

CROSS REFERENCE TO RELATED APPLICATIONS

This application is based on International Application No. PCT/CN2013/078214 filed on Jun. 27, 2013, which claims priority to Chinese National Application No. 201310156232.1 filed on Apr. 28, 2013. The entire contents of each and every foregoing application are incorporated herein by reference.

TECHNICAL FIELD

Embodiments of the present invention relate to a 3D display device.

BACKGROUND

The three-dimensional (3D) display technology is to endow a viewer with a stereoscopy by utilizing a binocular stereoscopic vision principle, and its main principle is that, different images are received by left and right eyes of the viewer, respectively, the two images having the "binocular parallax" constitute a "stereoscopic image pair" due to a position difference produced by the pupil distance between two eyes of the viewer, and a stereoscopic effect is produced after the "stereoscopic image pair" is fused in the brain.

Currently, the 3D display technology mainly has two broad categories: a glasses type and a naked-eye type. The so-called naked-eye type is that, by means of conducting a special treatment on a display panel, left-eye and right-eye images having the binocular parallax are independently sent into the left and right eyes of the viewer, respectively, so as to allow the viewer to experience a stereoscopic sensation with his naked eyes, without the help of glasses.

At present, regarding naked-eye 3D display devices, a 3D display is achieved by disposing a parallax barrier, a cylindrical lens or the like at a light existing side of a display screen such as a liquid crystal display (LCD). Among them, a 3D display device with a grating type parallax barrier is to install a grid-type optical barrier in front of the display screen for the sake of controlling a travelling direction of light or shielding the light, so that the left-eye and right-eye images having the parallax can be received by the left and right eyes simultaneously, and thus can be merged into a stereoscopic image in the brain.

So far, the grating type parallax barrier can be formed in a variety of ways. For example, the grating type parallax barrier may be implemented with cheaper printing films, patterns of the majority of the printing films are stripes in the shape of a strip or a rectangular similar to the pixel structure. A switchable liquid crystal thin film may also be used as the grating type parallax barrier for the stereoscopy display, and its principle is the same as that of the printing film, but the difference between them is that conversion between a 2D display state and a 3D display state can be realized by the liquid crystal thin film. Namely, when the 3D display needs to be performed, the liquid crystal thin film can be turned on to achieve the 3D display; and when the 3D display does not need to be preformed (i.e. in the 2D display state), the liquid crystal thin film can be turned off.

With respect to a current grating type parallax barrier, light-shielding stripes formed in the 3D display state generally take the shape of a strip or a rectangle, and this kind of light-shielding stripes may reduce the brightness of display owing to a shield against light simultaneous with achievement of a 3D display effect, so as to affect the viewer's visual experience.

SUMMARY

According to an embodiment of the invention, there is provided a 3D display device, for achieving a 3D display with high brightness.

The 3D display device provided by the embodiment of the invention comprises: a display panel; a first grating layer, located at a light exiting side of the display panel and comprising hole-like light-transmitting regions arranged in an array form; a second grating layer, located over the first grating layer and comprising hole-like light-transmitting regions arranged in an array form; and an adjusting device, configured to adjust a relative shift between the first grating layer and the second grating layer so as to realize switching between a 2D display state and a 3D display state, wherein, the hole-like light-transmitting regions included in the first grating layer correspond to the hole-like light-transmitting regions included in the second grating layer in a one-to-one correspondence relationship, pixel units arranged in an array form are provided within the display panel; in the 2D display state, an overlap region of projections of each pair of the hole-like light-transmitting regions on the display panel covers a region of at least one pixel unit; in the 3D display state, an overlap region of projections of each pair of the hole-like light-transmitting regions on the display panel is smaller than the region of one pixel unit.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
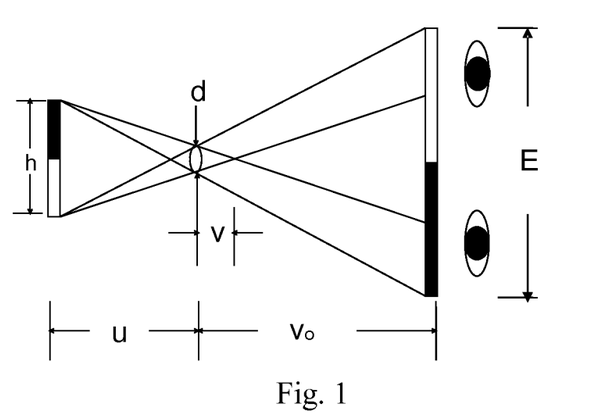
FIG. 1 is a schematic view illustrating the pinhole imaging theory.

It is with the use of the pinhole imaging theory that a 3D display is achieved by a 3D display device provided by embodiments of the present invention, and conditions of the pinhole imaging will be briefly described below. As shown in FIG. 1, provided that a height of a luminous object is h, an aperture of a grating is d, a distance from the luminous object to the grating (i.e. the object distance) is u, and a critical distance for pinhole imaging is v, it can be obtained from the homothetic triangle theory that, $v/d=(v+u)/h$, and thus, the critical distance $v=ud/(h-d)$. As can be seen from the formula, when the height h of the luminous object is larger than the aperture d of the grating, the critical distance v takes a positive value; when the height h of the luminous object is smaller than the aperture d of the grating, the critical distance v takes a negative value, which is meaningless; and when the height h of the luminous object is equal to the aperture d of the grating, the critical distance v is infinite, which is also meaningless. Therefore, one important condition of the pinhole imaging is that, the height h of the luminous object must be greater than the aperture d of the grating, i.e., a size of a pixel unit must be larger than the aperture of the grating. When the height h of the luminous object is smaller than or equal to d, wherever an imaging screen is placed, no reversed image can be seen on the imaging screen, namely, a propagation direction of light from the luminous object does not change.

Figure 2:
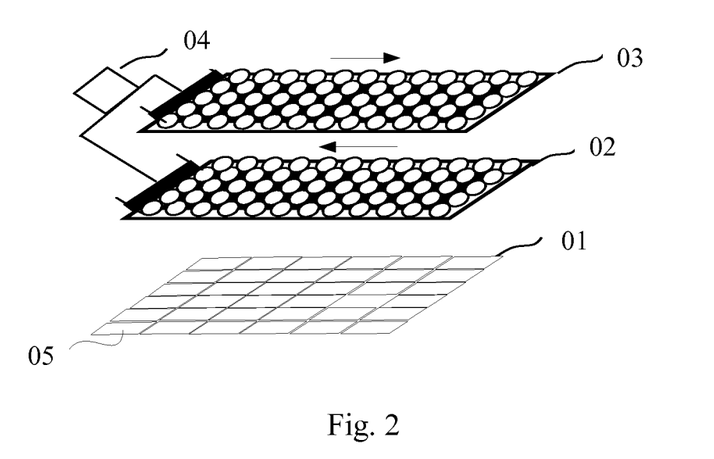
FIG. 2 is a structurally perspective view illustrating a 3D display device provided by an embodiment of the invention.

As shown in FIG. 2, the 3D display device provided by an embodiment of the invention comprises: a display panel 01; a first grating layer 02, located at a light exiting side of the display panel 01 and comprising hole-like light-transmitting regions arranged in an array form; a second grating layer 03, located over the first grating layer 02 and comprising hole-like light-transmitting regions arranged in an array form; and an adjusting device 04, configured to adjust a relative shift between the first grating layer 02 and the second grating layer 03 so as to realize switching between a 2D display state and a 3D display state. Herein, the hole-like light-transmitting regions included in the first grating layer 02 correspond to the hole-like light-transmitting regions included in the second grating layer 03 in a one-to-one relationship, pixel units 05 arranged in an array form are provided within the display panel 01.

Figure 3A:
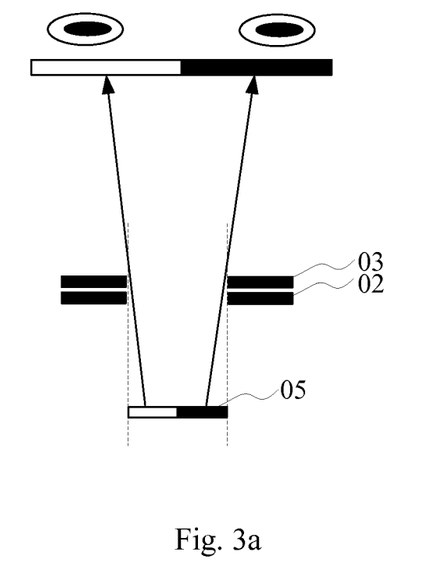
FIG. 3a and FIG. 3b are schematic views illustrating the principle of a 3D display device provided by an embodiment of the invention, in a 2D display state and in a 3D display state, respectively.

In the 2D display state, as shown in FIG. 3a, an overlap region (denoted by dashed lines in the figure) of projections of each pair of the hole-like light-transmitting regions on the display panel 01 covers a region of at least one pixel unit 05.

Figure 3B:
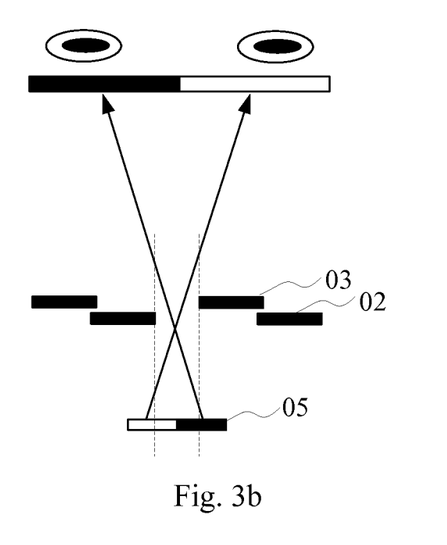

In the 3D display state, as shown in FIG. 3b, an overlap region (denoted by dashed lines in the figure) of projections of each pair of the hole-like light-transmitting regions on the display panel 01 is smaller than the region of one pixel unit 05.

Exemplarily, the display panel 01 according to embodiments of the invention may be a liquid crystal (LCD) display panel, an organic light emitting (OLED) display panel, a plasma (PDP) display panel, a cathode ray (CRT) display, or the like, to which no limit will be set here.

In the 3D display device provided by embodiments of the invention, by means of adjusting the overlap region between each of the hole-like light-transmitting regions included in the first grating layer 02 and the corresponding hole-like light-transmitting region included in the second grating layer 03 to meet or not meet conditions of the pinhole imaging, a switching between a 2D display state and a 3D display state can be achieved, wherein, a size of a pixel unit is equivalent to a size of a luminous object, and a size of the overlap region is equivalent to a size of a aperture of a grating.

Exemplarily, in order to allow the size of the overlap region between each of the hole-like light-transmitting regions included in the first grating layer 02 and the corresponding hole-like light-transmitting region included in the second grating layer 03 to meet conditions of the 2D display state and the 3D display state, respectively, namely, in the 2D display state, it can be known from the above conditions of pinhole imaging that, as shown in FIG. 3a, the overlap region (i.e. the aperture of the grating) between each of the hole-like light-transmitting regions included in the first grating layer 02 and the corresponding hole-like light-transmitting region included in the second grating layer 03 needs to be not smaller than the size of the pixel unit 05 (i.e. the luminous object); and in the 3D display state, as shown in FIG. 3b, it can be known from the above conditions of pinhole imaging that, the overlap region (i.e. the aperture of the grating) between each of the hole-like light-transmitting regions included in the first grating layer 02 and the corresponding hole-like light-transmitting region included in the second grating layer 03 needs to be smaller than the size of the pixel unit 05 (i.e. the luminous object). Exemplarily, if an aperture of each of the hole-like light-transmitting regions in the first grating layer 02 and the second grating layer 03 is configured to be greater than one pixel unit, for example, two pixel units, then it may be difficult to switch from the 2D state to the 3D state; and moreover, when the aperture of the hole-like light-transmitting region is larger, for the sake of guaranteeing switchability from the 2D state to the 3D state, it is required that a black shielding portion between the hole-like light-transmitting regions be configured to be larger, which may greatly reduce the resolution and brightness of display. If the aperture of each of the hole-like light-transmitting regions in the first grating layer 02 and the second grating layer 03 is configured to be smaller than one pixel unit, then the only thing we achieve is to meet the conditions of pinhole imaging in the 3D display state, and switching to the 2D display state may not be done. Thus, in order to achieve such a result as far as possible, that the display in the 2D state has a relatively high resolution and a less loss of brightness, and meanwhile, the conditions of pinhole imaging can be met in the 3D state, exemplarily, generally as shown in FIG. 3a and FIG. 3b, each pair of hole-like light-transmitting regions corresponds to each of the pixel units 05 in a one-to-one relationship, namely, the hole-like light-transmitting regions included in the first grating layer 02 as well as the hole-like light-transmitting regions included in the second grating layer 03 each correspond to the pixel units 05 in a one-to-one relationship.

Figure 4A:
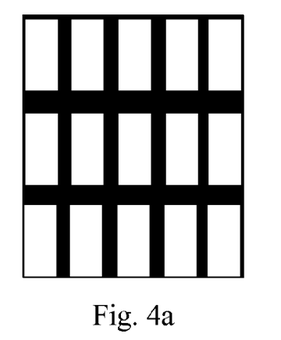
FIG. 4a and FIG. 4b are schematic top views illustrating overlap regions of hole-like light-transmitting regions in correspondence relationship in a first grating layer and a second grating layer, in a 2D display state and in a 3D display state, respectively.
Figure 4B:
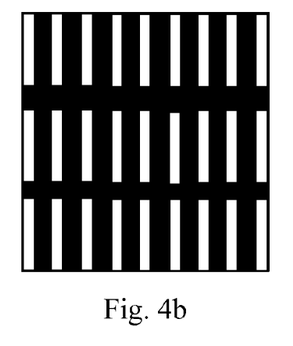
Figure 5A:
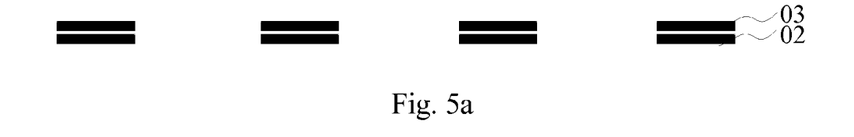
FIG. 5a and FIG. 5b are schematic cross-sectional views illustrating hole-like light-transmitting regions in correspondence relationship in a first grating layer and a second grating layer, in a 2D display state and in a 3D display state, respectively.
Figure 5B:
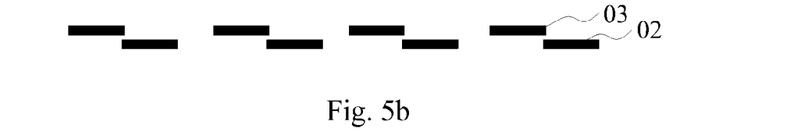

FIG. 4a and FIG. 4b are schematic top views illustrating overlap regions of the hole-like light-transmitting regions in correspondence relationship in the first grating layer 02 and the second grating layer 03, in the 2D display state and in the 3D display state, respectively. FIG. 5a and FIG. 5b are schematic cross-sectional views illustrating the hole-like light-transmitting regions in correspondence relationship in the first grating layer 02 and the second grating layer 03, in the 2D display state and in the 3D display state, respectively.

Exemplarily, a total area of the hole-like light-transmitting regions in the first grating layer is set to account for 60%-90% of a total area of the first grating layer, i.e., a total area of black shielding portions in the first grating layer accounts for 10%-40% of the total area of the first grating layer; and a total area of the hole-like light-transmitting regions in the second grating layer is set to account for 60%-90% of a total area of the second grating layer, i.e., a total area of the black shielding portions in the second grating layer accounts for 10%-40% of the total area of the second grating layer, so that a size of an overlap region of the hole-like light-transmitting regions in correspondence relationship in the two grating layers is regulated by utilizing the black shielding portions, after a relative shift between the first grating layer and the second grating layer occurs.

Exemplarily, the first grating layer and/or the second grating layer may be grating layer(s) produced by a black matrix material, in which the hole-like light-transmitting regions are produced.

Further, in order to make sure that each hole-like light-transmitting region in the first grating layer 02 and the second grating layer 03 shields a light exiting region of a pixel unit of the display panel 01 in a 2D display state to a lesser extent, it is possible that each hole-like light-transmitting region included in the first grating layer 02 and each hole-like light-transmitting region included in the second grating layer 03 are configured to be the same in both the shape and the dimension. That is, internal structures of the first grating layer 02 and the second grating layer 03 are uniform, and they are interchangeable in a position.

Further, in order to make sure that the 3D display device has a less loss of brightness in the 2D display state, it is possible that the shape of each hole-like light-transmitting region included in the first grating layer 02 as well as each hole-like light-transmitting region included in the second grating layer 03 is configured to be the same as the shape of each pixel unit. For example, it may be a square or a circle, and embodiments of the invention will not set a limit here.

Figure 6:
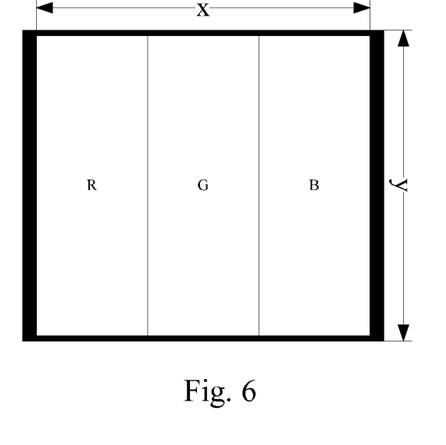
FIG. 6 is a schematic view illustrating a hole-like light-transmitting region in a 3D display device provided by an embodiment of the invention.

Description will be given below to an example in which the hole-like light-transmitting regions included in the first grating layer 02, the hole-like light-transmitting regions included in the second grating layer 03 and the pixel units each take the shape of a rectangle. Herein, as shown in FIG. 6, one pixel unit consists of three sub-pixel units of red, green and blue (RGB), and has a width of x and a length of y.

Exemplarily, the adjusting device 04 configured to adjust a relative shift between the first grating layer and the second grating layer so as to realize switching between a 2D display state and a 3D display state may comprise:

a first driving unit, configured to drive the first grating layer to shift along an extending direction of rows of pixel units; and/or a second driving unit, configured to drive the second grating layer to shift along the extending direction of rows of the pixel units.

Exemplarily, as the switching is made between the 2D display state and the 3D display state, it is possible only to drive the first driving unit, as shown in FIG. 2, so that the first grating layer 02 shifts along the extending direction (an arrow direction) of the rows of the pixel units with respect to the second grating layer 03; and it is also possible only to drive the second driving unit, so that the second grating layer 03 shifts along the extending direction (the arrow direction) of the rows of the pixel units with respect to the first grating layer 02. Certainly, in order to decrease a moving distance of a mechanical structure, the first driving unit and the second driving unit may also be driven simultaneously, so that the first grating layer and the second grating layer shift with respect to each other at the same time, and thus, adjustment of the size of the overlap region of the hole-like light-transmitting regions in correspondence relationship in the two grating layers can be achieved. Exemplarily, it is possible that in the 3D display state, the first grating layer and the second grating layer are regulated so that the two are subjected to the relative shift of (n+¼) x, wherein, n is an integer, and x is the width of one pixel unit.

Exemplarily, with respect to the first driving unit and the second driving unit, shifting of the first grating layer or the second grating layer can be realized by a stepper motor, a gear coaxially fixed to an output shaft of the stepper motor, and racks provided on the first grating layer and the second grating layer. Of course, it may also be achieved by other micro mechanical device, and no limitation will be made here.

Further, based on the pinhole imaging theory, on the premise that the conditions of pinhole imaging are met, as shown in FIG. 1, an imaging distance $v_o$ can be simplified to be: $v_o$=Eu/h, wherein, E is a distance between two pupils of human eyes, and $v_o$ is the imaging distance. According to the formula, the 3D display device provided by embodiments of the invention may further comprise: a third driving unit, configured to adjust a distance between the display panel 01 and the first grating layer 02; a signal acquisition unit provided on a front side of the display panel and comprising a distance acquisition module configured to collect a distance information between a face of a viewer in front of the display panel and the display panel; and a signal processing unit coupled to the distance acquisition module and the third driving unit by way of connection. A drive signal is generated by signal processing unit when the distance information collected by the distance acquisition module changes, and the third driving unit adjusts a relative distance between the display panel and the first grating layer on the basis of the drive signal, so that a distance between the first grating layer and the display panel is regulated on the basis of a distance between the viewer and the display panel and an optimal viewing effect in the 3D display state is attained.

For example, with a 10-inch 3D display device having a resolution of 1280*800 as an example, each sub-pixel unit has a width of about 55 μm, and a height of about 180 μm; then for an aperture of each of the hole-like light-transmitting regions in a first grating layer and a second grating layer, its width is 160 μm, and its height is 180 μm, and the distance between two pupils of human eyes is usually 6.5 cm. It is obtained by detection that, if a viewer observes at a distance of 1.4 m from the display panel, then a distance between the first grating layer and the display panel can be derived to be about 2 mm through computation, and by means of adjusting the distance between the first grating layer and the display panel with the use of the third driving unit, an optimal 3D viewing effect of the viewer can be realized.

Regarding a 3D display device provided by embodiments of the invention, a first grating layer comprising hole-like light-transmitting regions arranged in an array form is disposed at a light exiting side of a display panel, a second grating layer comprising hole-like light-transmitting regions arranged in an array form is disposed over the first grating layer, wherein, the hole-like light-transmitting regions included in the first grating layer correspond to the hole-like light-transmitting regions included in the second grating layer in a one-to-one correspondence relationship, and by means of adjusting a size of an overlap region of each of the hole-like light-transmitting regions in the first grating layer and the corresponding hole-like light-transmitting region in the second grating layer to meet or not meet conditions of pinhole imaging, a switching between a 2D display state and a 3D display state can be achieved. Exemplarily, a relative shift between the first grating layer and the second grating layer is adjusted by an adjusting device. In the 2D display state, an overlap region of projections of each pair of the hole-like light-transmitting regions on the display panel is adjusted to cover a region of at least one pixel unit, so that a normal display of an image displayed on the display panel is realized after it goes through each pair of the hole-like light-transmitting regions; and in the 3D display state, the overlap region of the projections of each pair of the hole-like light-transmitting regions on the display panel is adjusted to meet the conditions of pinhole imaging, i.e. to be smaller than the region of one pixel unit, so that an angle of light emitting from each sub-pixel unit in the display panel can be adjusted, and in turn, a left-eye image and a right-eye image are respectively converge on different positions, to realize naked-eye 3D display. As compared to light-shielding stripes, it can reduce shielding against light to avoid reducing of the display brightness, thereby achieving a 3D display with high brightness.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A 3D display device, comprising:
    a display panel;
    a first grating layer, located at a light exiting side of the display panel and comprising hole-like light-transmitting regions arranged in an array form;
    a second grating layer, located over the first grating layer and comprising hole-like light-transmitting regions arranged in an array form, wherein the first grating layer and/or the second grating layer are/is a grating layer made entirely of a black matrix material; and
    an adjusting device, configured to adjust a relative shift between the first grating layer and the second grating layer so as to realize switching between a 2D display state and a 3D display state,
    wherein, the hole-like light-transmitting regions included in the first grating layer correspond to the hole-like light-transmitting regions included in the second grating layer in a one-to-one correspondence relationship, pixel units arranged in an array form are provided within the display panel;
    in the 2D display state, an overlap region of projections of each pair of the hole-like light-transmitting regions on the display panel covers a region of at least one pixel unit;
    in the 3D display state, an area of an overlap region of projections of each pair of the hole-like light-transmitting regions on the display panel is smaller than the region of one pixel unit.

2. The 3D display device of claim 1, wherein, the each pair of the hole-like light-transmitting regions corresponds to each of the pixel units in a one-to-one position correspondence relationship.

3. The 3D display device of claim 2, wherein, the first grating layer and/or the second grating layer are/is a grating layer made of a black matrix material.

4. The 3D display device of claim 2, wherein, the display panel is a liquid crystal display panel, an organic light emitting display panel, a plasma display panel, or a cathode ray display.

5. The 3D display device of claim 1, wherein, the hole-like light-transmitting regions included in the first grating layer and the hole-like light-transmitting regions included in the second grating layer are the same in both the shape and the dimension.

6. The 3D display device of claim 5, wherein, the hole-like light-transmitting regions included in the first grating layer and the hole-like light-transmitting regions included in the second grating layer take the shape of a square or a circle.

7. The 3D display device of claim 6, wherein, the first grating layer and/or the second grating layer are/is a grating layer made of a black matrix material.

8. The 3D display device of claim 6, wherein, the display panel is a liquid crystal display panel, an organic light emitting display panel, a plasma display panel, or a cathode ray display.

9. The 3D display device of claim 5, wherein, the first grating layer and/or the second grating layer are/is a grating layer made of a black matrix material.

10. The 3D display device of claim 5, wherein, the display panel is a liquid crystal display panel, an organic light emitting display panel, a plasma display panel, or a cathode ray display.

11. The 3D display device of claim 1, wherein, a total area of the hole-like light-transmitting regions in the first grating layer accounts for 60%-90% of a total area of the first grating layer; and a total area of the hole-like light-transmitting regions in the second grating layer accounts for 60%-90% of a total area of the second grating layer.

12. The 3D display device of claim 11, wherein, the first grating layer and/or the second grating layer are/is a grating layer made of a black matrix material.

13. The 3D display device of claim 11, wherein, the display panel is a liquid crystal display panel, an organic light emitting display panel, a plasma display panel, or a cathode ray display.

14. The 3D display device of claim 1, wherein, the adjusting device comprises:
    a first driving unit, configured to drive the first grating layer to shift along an extending direction of rows of the pixel units; and/or
    a second driving unit, configured to drive the second grating layer to shift along the extending direction of the rows of the pixel units.

15. The 3D display device of claim 14, wherein, the first grating layer and/or the second grating layer are/is a grating layer made of a black matrix matrial.

16. The 3D display device of claim 14, wherein, the display panel is a liquid crystal display panel, an organic light emitting display panel, a plasma display panel, or a cathode ray display.

17. The 3D display device of claim 1, further comprising:
    a third driving unit, configured to adjust a distance between the display panel and the first grating layer;
    a signal acquisition unit, provided on a front side of the display panel and comprising a distance acquisition module for collecting a distance information between a face of a viewer in front of the display panel and the display panel; and
    a signal processing unit, coupled to the distance acquisition module and the third driving unit,
    wherein, a drive signal is generated by the signal processing unit under a condition that the distance information collected by the distance acquisition module changes, and the third driving unit adjusts a relative distance between the display panel and the first grating layer on the basis of the drive signal.

18. The 3D display device of claim 17, wherein, the first grating layer and/or the second grating layer are/is a grating layer made of a black matrix material.

19. The 3D display device of claim 1, wherein, the display panel is a liquid crystal display panel, an organic light emitting display panel, a plasma display panel, or a cathode ray display.

20. A 3D display device, comprising:

a display panel;

a first grating layer, located at a light exiting side of the display panel and comprising hole-like light-transmitting regions arranged in an array form and first light-shielding regions configured for separating adjacent hole-like light-transmitting regions of the first grating layer;

a second grating layer, located over the first grating layer and comprising hole-like light-transmitting regions arranged in an array form and second light-shielding regions configured for separating adjacent hole-like light-transmitting regions of the second grating layer; and an adjusting device, configured to adjust a relative shift between the first grating layer and the second grating layer so as to realize switching between a 2D display state and a 3D display state, wherein, the hole-like light-transmitting regions included in the first grating layer correspond to the hole-like light-transmitting regions included in the second grating layer in a one-to-one correspondence relationship, pixel units arranged in an array form are provided within the display panel;

in the 2D display state, an overlap region of projections of each pair of the hole-like light-transmitting regions on the display panel covers a region of at least one pixel unit;

in the 3D display state, an area of an overlap region of projections of each pair of the hole-like light-transmitting regions on the display panel is smaller than an area of the region of one pixel unit.

* * * * *